Patented Mar. 16, 1926.

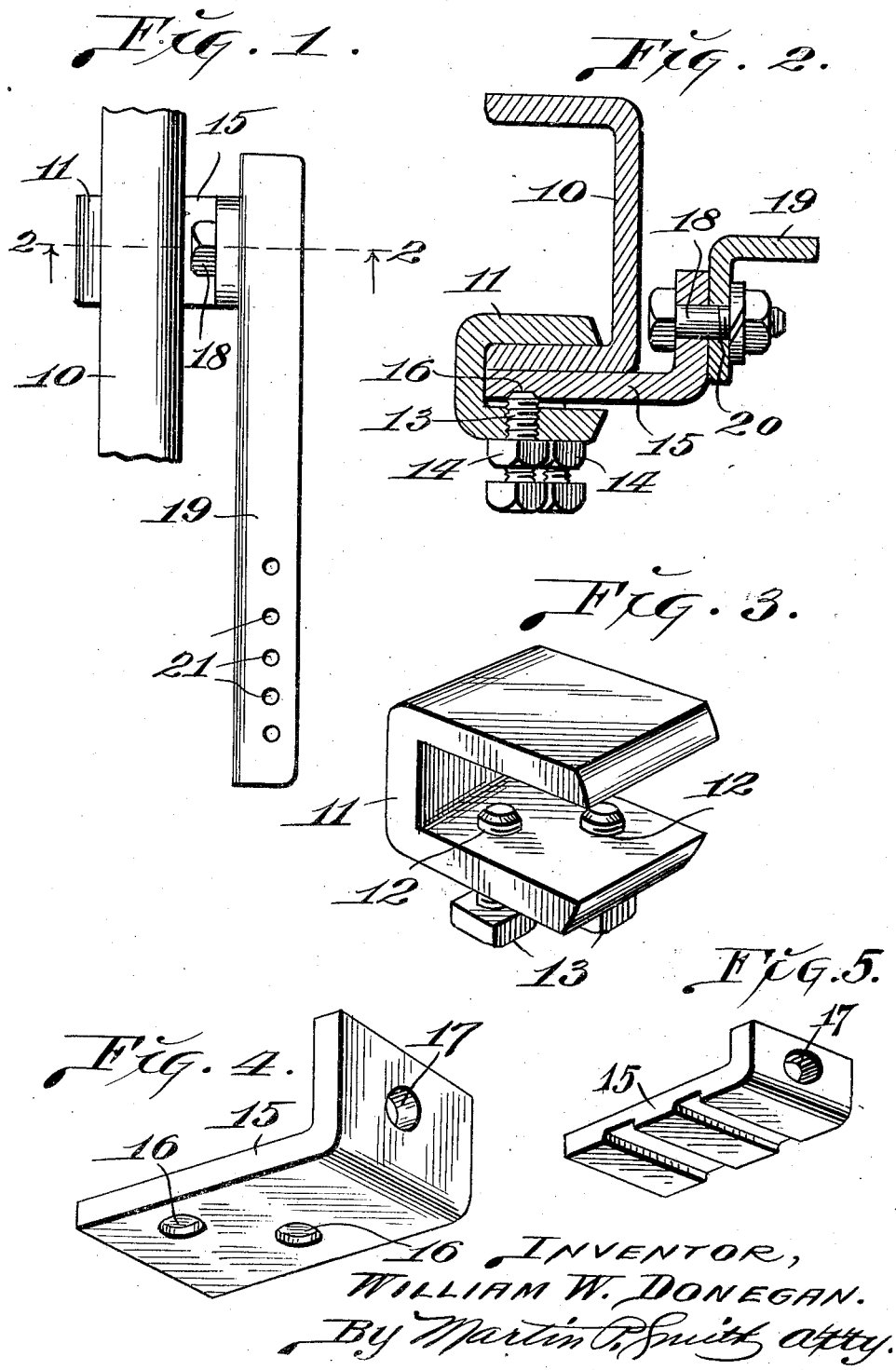

1,576,634

UNITED STATES PATENT OFFICE.

WILLIAM W. DONEGAN, OF LOS ANGELES, CALIFORNIA.

CLAMP FOR BUMPER-SUPPORTING BRACKETS.

Application filed March 16, 1925. Serial No. 15,943.

*To all whom it may concern:*

Be it known that I, WILLIAM W. DONEGAN, a citizen of the United States, residing at Los Angeles, in the county of Los Angeles and State of California, have invented certain new and useful Improvements in Clamps for Bumper-Supporting Brackets, of which the following is a specification.

My invention relates to clamps that are utilized for securing motor vehicle bumper supporting arms or brackets to frame members of the vehicle, the principal objects of my invention being to generally improve upon and simplify the construction of the existing forms of attaching and clamping brackets, to provide a clamp that may be easily and quickly secured to a frame member of the vehicle without necessitating the drilling of holes in said frame member, to provide a clamp that may be easily and cheaply produced, and further, to provide a clamp of relatively simple structure that will be very effective in performing its intended functions.

With the foregoing and other objects in view my invention consists in certain novel features of construction and arrangement of parts that will be hereinafter more fully described and claimed and illustrated in the accompanying drawings, in which:

Fig. 1 is a plan view of a portion of a motor vehicle frame and showing my improved clamp in position thereupon and supporting a bumper-carrying arm or bracket.

Fig. 2 is an enlarged cross section taken on the line 2—2 of Fig. 1.

Fig. 3 is a perspective view of the U-shaped member of my improved clamp.

Fig. 4 is a perspective view of the L-shaped member of my improved clamp.

Fig. 5 is a perspective view of a modified form of the L-shaped member of the clamp.

Referring by numerals to the accompanying drawings, which illustrate a practical embodiment of my invention, 10 designates one of the side rails or members of a motor vehicle frame and which member is generally channel shape in cross section, with its flanges horizontally disposed.

My improved clamp includes a substantially U-shaped member 11, which may be a malleable casting or forging and formed in one of the legs or plates of this member are two or more threaded apertures 12, in which are seated set screws or bolts such as 13, and upon the lower portions of these screws or bolts are located lock nuts 14.

The companion member of the clamp, which is illustrated in Fig. 4, comprises a substantially L-shaped member 15, which may be a forging or a malleable casting, and formed in the under or outer face of the longer leg of this L-shaped member are recesses 16 that are adapted to receive the ends of the screws 13, that are carried by the other member of the clamp. In some instances it may be found desirable to form shallow transversely disposed grooves instead of these recesses 16 and which grooves are shown in the form of clamp member illustrated in Fig. 5.

Formed in the central portion of the short leg of member 15 is an aperture 17, and which aperture is adapted to receive the bolt 18, that is utilized for securing the bumper supporting arm or bracket 19.

This arm or bracket may be a bar or plate, or it may be an angle bar, as illustrated in Figs. 1 and 2. The rear portion of this bar or bracket is provided with an aperture 20, for the reception of bolt 18 and the forward portion of said arm or bracket is provided with a series of apertures, such as 21, that are adapted to receive the bolts utilized for clamping the bumper.

When my improved clamping device is applied for use, the U-shaped member is applied to the lower flange of the side frame member of the vehicle, and the longer leg of the L-shaped member 15 is positioned between the flange of the frame member and the lower leg or plate of the U-shaped member 11. The two members are now manipulated so that the recesses 16 are in alignment with the apertures 12 and the set screws or bolts 13 are now screwed upwardly through the apertures 12 until the ends of said screws or bolts engage in the recesses 16. The screws or bolts are now tightened so as to very firmly secure the two parts of the clamp on the vehicle frame member, after which the lock nuts 14 are tightened against the underside of the lower leg of member 11, thereby preventing the bolts or set screws from becoming loose.

The rear end of the bumper supporting arm or bracket 19 is now secured to the short upturned leg of member 15 by means of the bolt 18, and its nut, and thus said bumper supporting arm or bracket is very firmly and rigidly connected to the vehicle frame in position to receive and support the bumper.

Thus it will be seen that I have provided a bumper supporting arm clamp that is relatively simple in structure, capable of being easily and cheaply produced, and which may be used for firmly and rigidly connecting the bumper supporting arm to the vehicle frame without necessitating the formation of bolt receiving appertures in the vehicle frame member.

It will be understood that minor changes in the size, form and construction of the various parts of my improved clamp may be made and substituted for those herein shown and described, without departing from the spirit of my invention, the scope of which is set forth in the appended claims.

I claim as my invention:

1. A bumper supporting arm clamp comprising a substantially U-shaped member that is adapted to be applied to a fixed part of a motor vehicle frame, set screws passing through one of the legs of said U-shaped member, and an L-shaped member, one of the legs of which is adapted to be engaged by the set screws in the other member.

2. A bumper supporting arm clamp comprising a substantially U-shaped member that is adapted to be applied to a fixed part of a motor vehicle frame, set screws passing through one of the legs of said U-shaped member, an L-shaped member provided in one of its legs with recesses that are adapted to receive the ends of the set screws in the other member and the other leg of said L-shaped member being provided with a bolt receiving aperture.

3. A bumper supporting arm clamp comprising a substantially U-shaped member that is adapted to be applied to a fixed part of a motor vehicle frame, a set screw passing through one of the legs of said U-shaped member, an L-shaped member that is adapted to be applied to the fixed part of the motor vehicle frame, and to be engaged by the set screw of said U-shaped member, and said L-shaped member being provided with a bolt receiving aperture.

4. A bumper supporting arm clamp comprising a pair of members that are adapted to be applied to a fixed part of a motor vehicle frame, means carried by one of said members and adapted to bear on the other member so as to clamp the two members on the engaged part of the motor vehicle frame and one of said clamp members being provided with a bolt receiving aperture.

In testimony whereof I affix my signature.

WILLIAM W. DONEGAN.